United States Patent [19]

Nakamura et al.

[11] Patent Number: 4,602,374
[45] Date of Patent: Jul. 22, 1986

[54] MULTI-LEVEL DECISION CIRCUIT

[75] Inventors: Yasuhisa Nakamura, Yokohama; Yoichi Saito, Yokosuka, both of Japan

[73] Assignee: Nippon Telegraph & Telephone Public Corporation, Tokyo, Japan

[21] Appl. No.: 702,762

[22] Filed: Feb. 19, 1985

[30] Foreign Application Priority Data

Feb. 27, 1984 [JP] Japan .................................. 59-37106
Oct. 15, 1984 [JP] Japan .................................. 59-215879

[51] Int. Cl.$^4$ ......................... H03M 1/06; H03M 1/12
[52] U.S. Cl. ..................................... 375/17; 307/359; 340/347 AD; 340/347 CC; 375/39; 375/76
[58] Field of Search ....................... 375/17, 28, 30, 33, 375/39, 76; 340/347 CC, 347 AD; 307/350, 358, 359

[56] References Cited

U.S. PATENT DOCUMENTS

| | | | |
|---|---|---|---|
| 4,355,402 | 10/1982 | Kromer, III et al. | 375/17 |
| 4,410,876 | 10/1983 | Sawagata | 340/347 AD |
| 4,415,882 | 11/1983 | Akazawa et al. | 340/347 AD |
| 4,549,165 | 10/1985 | Brian | 340/347 CC |
| 4,560,940 | 12/1985 | Schans | 307/359 |

Primary Examiner—Benedict V. Safourek
Attorney, Agent, or Firm—Pollock, VandeSande and Priddy

[57] ABSTRACT

An input multi-level amplitude signal of $2^M$ levels is supplied via a DC level controller to an AD converter for conversion into an N-bit (N being an integer greater than M) digital signal, and M high-order bits of the digital signal are provided as decided outputs. It is decided by a decision means whether a deviation of the DC level of the multi-level amplitude signal at the input side of the AD converter is in excess of a predetermined value. When the deviation of the DC level is decided less than the predetermined value, the outputs of bits less significant than the Mth bit in the digital signal are integrated for input as a DC level control signal into the DC level controller, correcting the deviation of the DC level. When it is decided by the decision means that the deviation of the DC level is greater than the predetermined value, at least one of the M high-order bit outputs in the output digital signal is integrated for input as a DC level control signal into the DC level controller, correcting the deviation of the DC level.

13 Claims, 18 Drawing Figures

FIG. 2

| INPUT SIG LEVEL | OUTPUT SIG | | | | THRESHOLD LEVEL |
|---|---|---|---|---|---|
| | 1($B_1$) MSB | 2($B_2$) | 3($B_3$) | 4($B_4$) LSB | |
| ↑ | 1 | 1 | 1 | 1 | |
| • | | | | | ⇐ $B_4$ |
| | | | | 0 | ← $B_3$ |
| • | | | 0 | 1 | ⇐ $B_4$ |
| | | | | 0 | ← $B_2$ |
| • | | 0 | 1 | 1 | ⇐ $B_4$ |
| | | | | 0 | ← $B_3$ |
| • | | | 0 | 1 | ⇐ $B_4$ |
| | | | | 0 | ← $B_1$ |
| • | 0 | 1 | 1 | 1 | ⇐ $B_4$ |
| | | | | 0 | ← $B_3$ |
| • | | | 0 | 1 | ⇐ $B_4$ |
| | | | | 0 | ← $B_2$ |
| • | | 0 | 1 | 1 | ⇐ $B_4$ |
| | | | | 0 | ← $B_3$ |
| • | | | 0 | 1 | ⇐ |
| ↓ | | | | 0 | |

FIG. 9

| | ERROR SIG | | | | | OUTPUT OF COMP 55 | OUTPUT OF COMP 56 | OUTPUT OF DECISION 29 |
|---|---|---|---|---|---|---|---|---|
| POLARITY | MAGNITUDE ⇩ | | | | | | | |
| $B_4$ | $B_5$ | $B_6$ | $B_7$ | $B_8$ | | | | |
| 1 | 1 | 1 | 1 | 1 | | 1 | 1 | 1 |
| | | | | 0 | | | | |
| | | | 0 | 1 | | | | |
| | | | | 0 | | | | |
| | | 0 | 1 | 1 | | | | |
| | | | | 0 | | | | |
| | | | 0 | 1 | | | | |
| | | | | 0 | | | | |
| | 0 | 1 | 1 | 1 | | | 0 | 0 |
| | | | | 0 | | | | |
| | | | 0 | 1 | | | | |
| | | | | 0 | | | | |
| | | 0 | 1 | 1 | | | | |
| | | | | 0 | | | | |
| | | | 0 | 1 | | | | |
| | | | | 0 | | | | |
| 0 | 1 | 1 | 1 | 1 | | 0 | | 0 |
| | | | | 0 | | | | |
| | | | 0 | 1 | | | | |
| | | | | 0 | | | | |
| | | 0 | 1 | 1 | | | | |
| | | | | 0 | | | | |
| | | | 0 | 1 | | | 1 | 1 |
| | | | | 0 | | | | |
| | 0 | 1 | 1 | 1 | | | | |
| | | | | 0 | | | | |
| | | | 0 | 1 | | | | |
| | | | | 0 | | | | |
| | | 0 | 1 | 1 | | | | |
| | | | | 0 | | | | |
| | | | 0 | 1 | | | | |
| | | | | 0 | | | | |

Left axis: DC DRIFT ⇩, +d/4, −d/4, MIN SIG LEVEL INTERVAL d

FIG. 18

| INPUT SIG DC DRIFT ΔV | | ΔV ≈ 0 | \|ΔV\| > d/4 |
|---|---|---|---|
| NORMAL LOCK | DECISION (A) OUTPUT | 0 | 1 |
| | DECISION (B) OUTPUT | 0 | 1 |
| | OR CKT 65 OUTPUT | 0 | 1 |
| FALSE LOCK | DECISION (A) OUTPUT | 0 | 1 |
| | DECISION (B) OUTPUT | 1 | 1 |
| | OR CKT 65 OUTPUT | 1 | 1 |

MULTI-LEVEL DECISION CIRCUIT

BACKGROUND OF THE INVENTION

The present invention relates to a multi-level decision circuit for use in a digital communication system utilizing a multi-level modulated signal, and more particularly to a multi-level decision circuit which is supplied with a multi-level signal of $2^M$ levels (M being an integer equal to or greater than 2) and decides which one of the $2^M$ levels the input multi-level signal belongs to.

Known as a digital transmission system using the microwave band is a 16 QAM (Quadrature Amplitude Modulation) system. With this system, binary digital signals of two sequences $A_1$ and $A_2$ are converted by a DA converter into a 4-level digital signal using the signal $A_1$ as a high-order bit of a 2-bit binary signal and the signal $A_2$ as a low-order bit thereof. A carrier is amplitude modulated by the 4-level digital signal. In the meantime, binary digital signals of two sequences $B_1$ and $B_2$ are similarly converted into a 4-level digital signal, by which is amplitude modulated a carrier displaced 90 degrees apart in phase from the abovesaid carrier. The both amplitude-modulated outputs are combined into a composite signal for transmission. At the receiving side, the received signal is coherently detected by recovered carriers phased 90 degrees apart, by which the abovesaid two 4-level digital signals are demodulated. These 4-level digital signals are respectively converted by AD converters into binary digital signals, thus obtaining the aforementioned binary digital signals $A_1$, $A_2$ and $B_1$, $B_2$.

A multi-level quadrature amplitude modulation system has been proposed in which, in general, M (M being an integer equal to or greater than 2) bit binary digital signals are converted to a $2^M$-level digital signal and carriers are modulated by such $2^M$-level digital signals of two sequences into a QAM signal. With such a multi-level amplitude modulation system, in order to correctly decide the multi-level amplitude signal at the receiving side, it is necessary that the levels of the multi-level amplitude signal input to a decision circuit be held in level regions predetermined in accordance with the number of levels. If the DC level of the input multi-level amplitude signal fluctuates, then the probability that the (M+1)th bit from MSB of the AD converter output (those bits from MSB to the Mth one being decided outputs) becomes mark "1" deviates from 50%. In order to detect and eventually eliminate the deviation, a DC signal which is supplied to a DC amplifier provided in the preceding stage of the AD converter is subjected to feedback control so that the DC level at the output of the DC amplifier assumes a reference value. This is disclosed in the Japanese Patent Application Laid Open No. 58-101449, published on June 16, 1983. Further, it has been proposed in the Japanese Patent Application Laid Open No. 57-131152, published on Aug. 13, 1982 that the gain of the DC amplifier is feedback-controlled by the output of the AD converter so that the variation in the level of the DC amplifier output comes to agree with a predetermined value.

Accordingly, it is considered that the input multi-level amplitude signal could correctly be decided by simultaneously effecting the control of DC level and gain. As a result of the present inventors' experiments and researches, however, it has been found out that this method cannot prevent the occurrence of errors, too. The reason for this is that if the DC level of the multi-level amplitude signal at the input side of the AD converter shifts upward or downward by an integral multiple of the interval between adjacent levels, the feedback control could be stabilized in that state. Such a stable state is called a false lock state.

SUMMARY OF THE INVENTION

An object of the present invention is to provide a multi-level decision circuit which detects the false lock state of the feedback control system and recovers it to its normal lock state.

It is another object of the present invention to provide a multi-level decision circuit which detects the likelihood of the false lock state and creates the state in which the false lock phenomenon is difficult to come about.

According to the present invention, the multi-level amplitude signal of $2^M$ levels is provided to a DC level controller and the DC level to be superimposed on the output multi-level signal of the DC level controller is controlled by a DC level control signal. The output multi-level signal of the DC level controller is converted by an AD converter into a digital signal of N bits (N being greater than M) and its M high-order bits are provided as decided outputs of the multi-level amplitude signal. The outputs of (M+1)th and less significant bits and at least one of M high-order bits in the AD converter output are applied to a DC level control feedback signal generating means. A DC level control feedback signal from the feedback signal generating means is integrated and is fed as the abovesaid DC level control signal back to the DC level controller. By the feedback of at least one of the M high-order bit outputs, the state in which the false lock phenomenon is difficult to present itself is brought about before or after the feedback system is put into the false lock state.

It is decided by a decision means whether the fluctuation in the DC level superimposed on the multi-level amplitude signal at the input side of the AD converter is in excess of a predetermined value, and by the output decision signal of the decision means, a switch provided in the DC level control feedback signal generating means is controlled. The switch is controlled by the decision output when it is decided by the decision means that the DC level variation exceeds the predetermined value, and in this case alone, at least one of the M high-order bit outputs is integrated to provide the DC level control signal. When it is decided by the decision means that the DC level variation is at least less than the predetermined value, the aforesaid (M+1)th bit output is integrated to produce the DC level control signal.

The number N of bits of the output digital signal from the AD converter is selected two or more larger than the M. The decision means decides whether the absolute value of the bit output less significant than the (M+1)th bit output in the output digital signal is larger than a predetermined value. If the absolute value is larger than the predetermined value, it is decided that the feedback system is likely to be put into the false lock state, and at least one of the M high-order bit outputs is provided from the feedback signal generating means. Alternatively, based on a bias of the probability of occurrence of a "1" and a "0" in connection with at least one of the M high-order bits which are the decided outputs, the decision means decides whether the DC level fluctuation is in excess of the predetermined value. In the case of excess, it is decided that the feedback system is in the false lock state. Alternatively, the decision means branches the input multi-level amplitude signal of the AD converter, integrates the branched output and decides, based on the integrated output level, whether the DC level variation is in excess of the predetermined value. Also in the case of excess, it is decided that the feedback system is in the false lock state. It is also possible to convert the outputs of the (M+1)th and less significant bits of the AD converter output by a DA converter into an analog signal and to integrate the analog signal for use as the abovementioned DC level control signal in the normal lock state.

BRIEF DESCRIPTION OF THE DRAWINGS

FIG. 2 is a diagram showing, by way of example, the relationships among input multi-level amplitude signal levels, a digital signal and threshold levels in the case where M=3, that is, where the input multi-level amplitude signal is 8-level;

FIG. 9 is a diagram showing, by way of example, the levels of the multi-level amplitude signal in the case of the normal lock state, its DC drift, error signals $B_4$ to $B_8$ ($B_{M+1}$ to $B_N$), the outputs of comparators 55 and 56 and the output of the decision means 29;

FIG. 18 is a diagram showing the output states of decision means 29a and 29b and an OR circuit 65 in the embodiment of FIG. 17.

DESCRIPTION OF THE PREFERRED EMBODIMENTS

Figure 1:
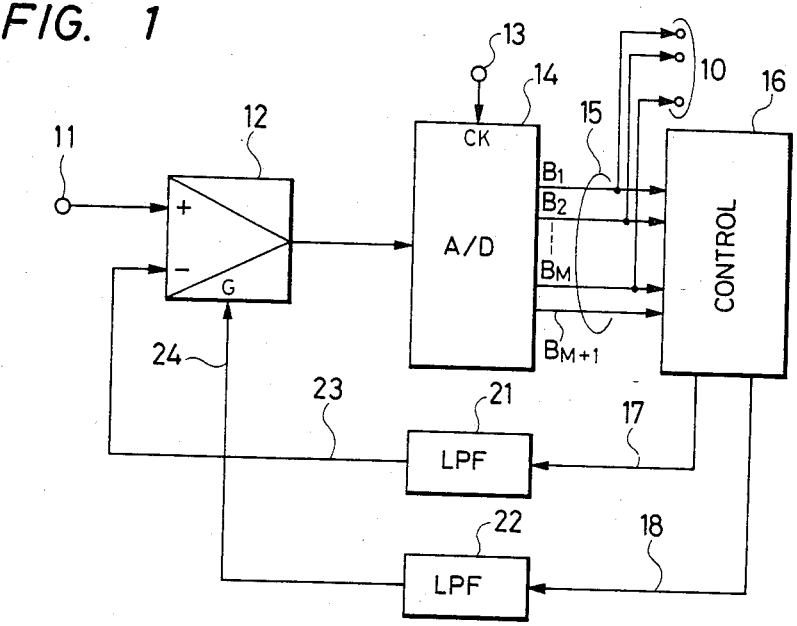
FIG. 1 is a block diagram showing an example of a multi-level decision circuit which can be deduced from the prior art.

To facilitate a better understanding of the present invention, a description will be given first of the multi-level decision circuit that can be deduced from the aforementioned prior art examples. Reference is made first to FIG. 1. A multi-level amplitude signal (a multi-level digital signal) which can assume $2^M$ levels, applied from a signal input terminal 11, is amplified by a DC amplifier 12. The output of the DC amplifier 12 is converted by an analog-to-digital (AD) converter 14 into a digital signal in synchronism with a clock from a clock input terminal 13. The clock from the clock input terminal 13 is, in turn, synchronized with the time slot of the multi-level digital signal from the signal input terminal 11. The AD converter 14 is such one that yields an output of M+1 bits, and it decides levels of the input multi-level amplitude signal with a resolution of M+1 bits for conversion into a digital signal 15. The M high-order bits of the digital signal 15 are provided as decided outputs to output terminals 10. At the same time, the digital signal 15 is applied to a control circuit 16. The control circuit 16 produces, by a 1-bit output or a combination of two or more bit outputs of the digital signal 15, a feedback signal 17 for controlling a DC voltage offset of the DC amplifier 12 and a feedback signal 18 for controlling its gain. The feedback signals 17 and 18 are provided to low-pass filters 21 and 22, respectively, wherein they are smoothed or integrated, and from which they are applied as a DC level control signal 23 and as a gain control signal 24 to the DC amplifier 12. The offset voltage of the DC amplifier 12 is altered by the DC level control signal 23 and the DC level to be superimposed on its output is automatically controlled to assume an optimum value. The gain of the DC amplifier 12 is automatically controlled by the gain control signal 24 to take an optimum value. As a result of this, the input level of the AD converter 14 is always held optimum.

FIG. 2 shows the relationships between the levels of the input amplitude signal and the output signal 15 from the AD converter 14 in the case of a ($2^3$=8)-level amplitude signal being applied to the signal input terminal 11. In FIG. 2, the levels that the input 8-level signal can assume are indicated by the black circles in the left-hand column, and threshold levels corresponding to respective bits ($B_1$ to $B_4$) of the output signal 15 are given by arrows in the right-hand column. For example, the output signal $B_1$ of the most significant bit goes to a "1" or "0" depending upon whether the level of the input 8-level signal is higher or lower than the corresponding threshold level ($B_1$). The output signal $B_2$ of the second high-order bit goes to a "1" or "0" depending upon whether the level of the input 8-level signal above the threshold level ($B_1$) in the case of the output signal $B_1$ being a "1" is higher or lower than the threshold level ($B_2$). Also when the output signal $B_1$ is a "0", the output signal $B_2$ goes to a "1" or "0" depending upon whether the level of the input 8-level signal is higher or lower than the threshold level ($B_2$) which is below the threshold level ($B_1$). The third high-order bit $B_3$ is also decided in the same manner as described above.

Ideally, eight threshold levels ($B_4$) for the output signal of the least significant bit $B_4$ are respectively equal to those eight levels the input 8-level amplitude signal can take. The output signal $B_4$ of the least significant bit indicates the direction of a DC offset of the input signal. That is, as shown in FIG. 2, when the amplitude of the input 8-level amplitude signal and its offset-superimposed DC level are ideal, the output signal $B_4$ of the least significant bit goes to a "0" (space) and a "1" (mark) with 50—50% probabilities. If the offset of the input level shifts, then the above probabilities also vary, but by feeding the least significant bit output as the DC level control signal 23 back to the input side, the offset of the input level can be locked and held at a predetermined value.

It has been found out experimentally by the present inventors, however, that there are cases where an error is produced in the decided output although the offset lock by the feedback control is stabilized. The present inventors' studies and experiments have revealed that this is for such reason as follows: That is, also in the case even when the input multi-level amplitude signal offsets positive or negative, from some cause, by an integral multiple of a minimum signal level interval (i.e. a voltage value between adjacent levels of the multi-level signal) d, the least significant bit output sometimes goes to a "0" or "1" with a 50% probability and, in this case, the feedback control signals become stabilized. This is called a false lock phenomenon. In the state of such a false lock phenomenon, a decision error is produced and, in addition, once the feedback system gets into this state, it is retained stable, resulting in a continuation of decision errors. Based on the inventors' theoretical formula which expresses, as a function of the amount of drift, an average $V_d$ of the DC level control voltages obtainable from the mark ratios of digital outputs of the respective output bits from the AD converter which is supplied with an input signal that is the sum of the input $2^M$-level amplitude signal having a drift and thermal noise, the present inventors have succeeded in analyzing that there exist $(2^M-1)$ possible values of the amounts of drift at which no DC level control voltage is produced (i.e. $V_d=0$) and the abovesaid stable state is brought about. The false lock phenomenon is caused at $(2^M-2)$ of the $(2^M-1)$ stable points and a normal lock state is allowed at only one stable point.

Figure 3:
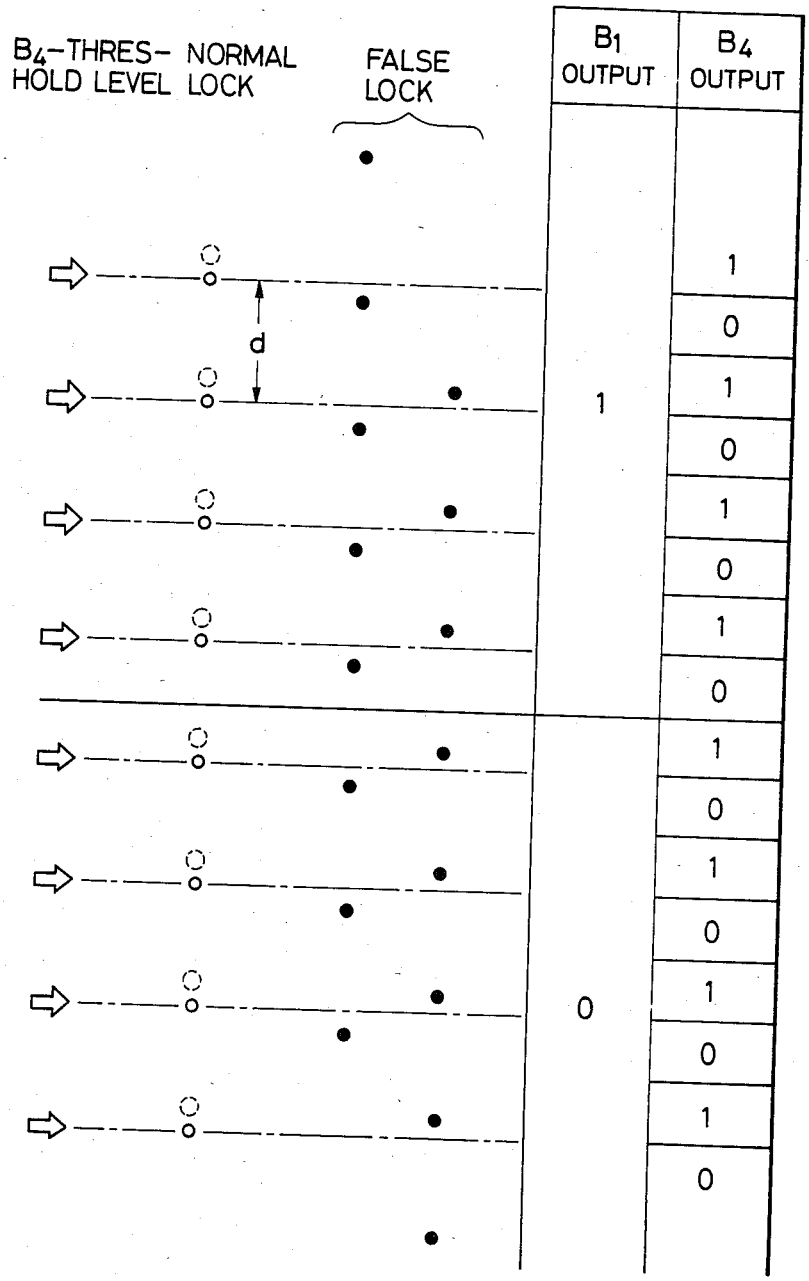
FIG. 3 is a diagram showing, by way of example, the relationships among threshold levels for an (M+1)th or 4th bit, the levels that the multi-level signal can assume in the case of the normal lock state, the levels that the multi-level signal can assume in the case of the false lock state, the most significant bit output $B_1$ and the (M+1)th or 4th bit output $B_4$.

FIG. 3 shows examples of the false lock phenomena. In FIG. 3 there are shown from left to right, by arrows, threshold levels for the least significant bit $B_4$ in the case of an AD conversion of the input $2^3$-level amplitude signal, by white circles, the eight levels that the input $2^3$-level amplitude signal can take in a normal lock state, by black circles, the levels that the input $2^3$-level amplitude signal can assume in the false lock state when the input amplitude signal deviates upward by a value a little smaller than the minimum signal level interval d, and again by black circles, the levels that the input $2^3$-level amplitude signal can assume in the false lock state when the input amplitude signal deviates downward by a value slightly smaller than the minimum signal level interval d. At the right-hand side are shown a level region in which the most significant bit $B_1$ goes to a "0" and a "1" and a level region in which the least significant bit $B_4$ goes to a "0" and a "1" with respect to the threshold levels corresponding thereto. In the normal lock state, since the levels that the input $2^3$-level amplitude signal can take are just in agreement with the threshold levels for the bit $B_4$, the probabilities that the least significant bit output $B_4$ goes to a "0" and a "1" are 50—50%. In the event that the input $2^3$-level amplitude signal shifts upward by a value slightly smaller than the minimum signal level interval d, the probability that the highest level of the input signal is decided to be a "1" is 100%, and the probabilities of the other seven levels being decided to be "0s" are high, but since they are close to the threshold levels for the output $B_4$, the input signal level may sometimes be decided to be a "1"; accordingly, the total probabilities that it is decided to be a "1" and a "0" are 50—50%. Thus, the feedback system is put in the false lock state. It will be seen from the above that the false lock phenomenon will also be presented when the input signal level becomes lower than a steady-state input signal by a value slightly smaller than the minimum signal level interval d. Moreover, the false lock phenomenon will occur also when the input signal level deviates upward or downward substantially twice and three times as much as the minimum signal level interval d.

The feedback control in the conventional multi-level decision circuit is effective for output signal variations in the low-frequency component caused by temperature changes and so forth, but once false lock phenomenon presents itself owing to fading and like external disturbances such as caused by initial power source connection, the feedback system is kept stably in the false lock state, continuing to produce decision errors. The larger the number of levels of the input multi-level amplitude signal is, the more readily the false lock phenomenon comes about. Moreover, once the feedback system has been put in the false lock state, adjustment must be made in succession for optimizing the offset of the DC amplifier 12.

Figure 4:
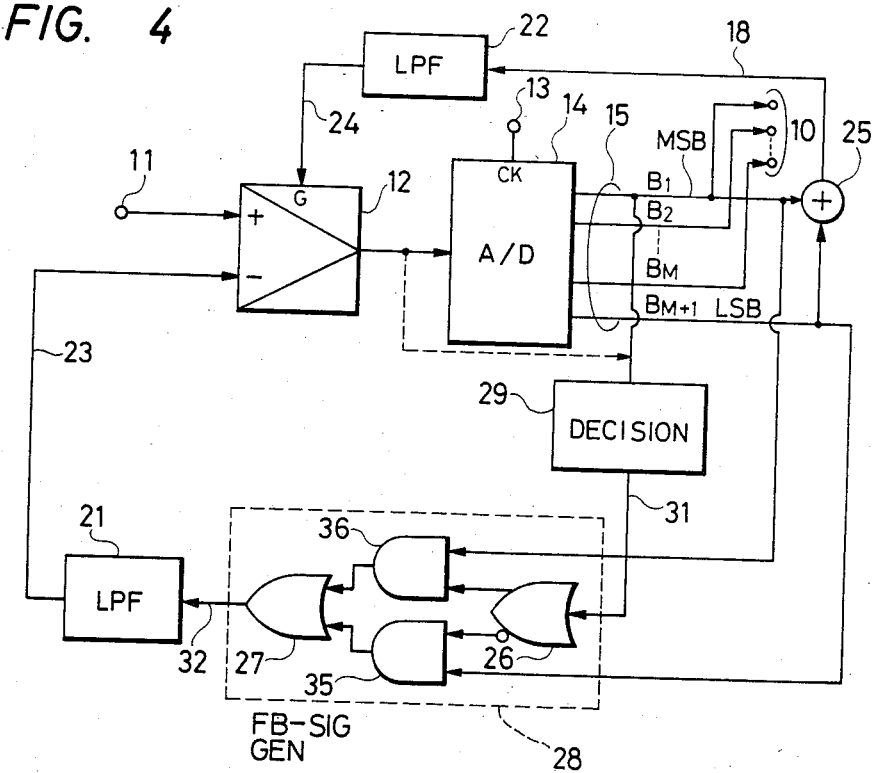
FIG. 4 is a block diagram illustrating an example of the multi-level decision circuit of the present invention for detecting the false lock state.

Next, a detailed description will be given with reference to FIG. 4 et seq., of embodiments of the present invention. Referring first to FIG. 4, the multi-level amplitude signal of $2^M$ levels from the signal input terminal 11 is applied to the DC amplifier 12 serving as a DC level controller. The output signal of the DC amplifier 12 is sampled by the AD converter 14 of an (M+1)-bit resolution in synchronism with the clock signal from the clock input terminal 13 and converted into the digital signal 15 of M+1 bits. The M high-order bits of the digital signal 15 are supplied as decided outputs to the output terminals 10. The most significant bit $B_1$ and the least significant bit $B_{M+1}$ of the digital signal 15 are input into an exclusive-OR circuit 25 serving as a gain control feedback signal generator, and its output is the gain control feedback signal 18. The feedback signal 18 is integrated by the low-pass filter 22 and then fed as the gain control signal 24 back to the DC amplifier 12 to control its gain.

Further, the most significant bit $B_1$ and the least significant bit $B_{M+1}$ of the digital signal 15 are applied to a DC level control feedback signal generating means 28, and a DC level control feedback signal 32 output therefrom is integrated by the low-pass filter 21 and applied as the DC level control signal 23 to the DC amplifier 12 to control the DC level which is to be superimposed on its output. As the DC amplifier 12 is employed a differential amplifier, which has its non-inverting input terminal connected to the signal input terminal 11 and its inverting input terminal connected to the output side of the low-pass filter 21 and by which the DC level control signal from the filter 21 is subtracted from the input multi-level amplitude signal and is amplified. The most significant bit $B_1$ of the digital signal 15 is also provided to a decision means 29 to output therefrom a decision signal 31, by which the feedback signal generator 28 is controlled to yield an optimum DC level control feedback signal 32 in accordance with the lock state being present.

In this example, by monitoring a signal 33 which is a part of the (M+1)-bit digital signal 15 from the AD converter 14, the decision means 29 decides whether the feedback system is in the normal or false lock state, and produces the decision signal 31. The DC level control feedback signal generating means 28, in this example, switches between the input most significant and least significant bits $B_1$ and $B_{M+1}$ and provides one of them as the DC level control feedback signal 32. That is, the decision signal 31 is distributed by a distribution circuit 26 into outputs of opposite polarities, which are supplied to gates 35 and 36. The gates 35 and 36 are also supplied with the most significant and least significant bits $B_1$ and $B_{M+1}$ of the digital signal 15, respectively, and the outputs of the gates 35 and 36 are provided to an OR gate 27, obtaining therefrom the DC level control feedback signal 32. When the feedback system is being decided to be in the normal lock state, the gate 35 is open, through which the least significant bit $B_{M+1}$ is provided as the feedback signal 32. In the false lock state, the gate 36 is held open to pass therethrough the most significant bit $B_1$ as the feedback signal 32.

With this embodiment, by controlling the gain and offset of the DC amplifier 12 to have optimum values even in the false lock state, as will be described later, the feedback system can be rapidly recovered from the false lock state to the normal one, permitting the AD converter 14 to make decisions at an optimum threshold levels at all times. Accordingly, even if the number of amplitude levels of the input signal increases, a stable deciding function can be achieved with a simple circuit arrangement.

The decision of the $2^3$-level amplitude signal will be described in concrete terms. In this case, a converter of 4-bit output is employed as the AD converter 14. That is, the input $2^3$-level amplitude signal, the threshold levels and the four bits $B_1$, $B_2$, $B_3$ and $B_4$ of the output digital signal 15 of the AD converter 14 bear such relationships as shown in FIG. 2. In the normal lock state, that is, when the gate 35 is open, if the level of the input $2^3$-level amplitude signal to the AD converter 14 slightly shifts to the positive side, the input $2^3$-level amplitude signal becomes as indicated by the broken-line white circles in FIG. 3, so the possibility of the least significant bit output $B_4$ going to a "1" becomes high. As a result of this, the output from the low-pass filter 21 goes positive and the DC level of the output from the DC amplifier 12 is shifted to the negative side, optimizing the level of the input multi-level amplitude signal of the AD converter 14. Incidentally, let it be assumed that the DC level control feedback signal generating means 28 produces a voltage $+V_1$ or $-V_1$ depending upon whether the OR gate 27 yields an output of logic "1" or "0". Conversely, when the input $2^3$-level amplitude signal slightly shifts to the negative side, the probability of the least significant bit $B_4$ going to a "0" becomes high. In consequence, the output of the low-pass filter 21 goes negative and the DC level of the output amplitude signal from the DC amplifier 12 is controlled to shift to the positive side, optimizing the input amplitude signal level of the AD converter 14.

When the false lock state in which the gate 36 is open is brought about after the input $2^3$-level amplitude signal deviates to the positive side by a value substantially equal to the minimum signal level interval d, for example, as shown in FIG. 3, the ratio that the level of the input $2^3$-level amplitude signal exceeds the threshold level for the most significant bit output $B_1$ increases, resulting in a high ratio of the most significant bit output $B_1$ going to a "1". In consequence, the low-pass filter 21 produces a positive output, by which the DC level of the output from the DC amplifier 12 is controlled to shift to the negative side, permitting a quick recovery from the false lock state to the normal one. Similarly, when the feedback system is put in the false lock state after the DC level of the input $2^3$-level amplitude signal shifts to the negative side by a value substantially equal to the minimum signal level interval d, as shown in FIG. 3, since the ratio that the most significant bit output $B_1$ goes to a "0" becomes high, the low-pass filter 21 provides a negative output, by which the DC level of the output from the DC amplifier 12 is controlled to shift to the positive side, making a rapid recovery to the normal lock state.

Since the decision means 29 needs only to detect whether the DC level superimposed on the multi-level amplitude signal at the input side of the AD converter 14 has fluctuated in excess of a predetermined value from the DC level in the ideal lock state, it is possible to employ a method utilizing the mark ratio or average voltage value of the most significant bit output signal 33. The method utilizing the mark ratio will be described first. In the case where the input multi-level amplitude signal is ideally received and the probabilities of assuming the respective levels are equal at that time, the mark ratio (the probability of occurrence of a "1") of the most significant bit output $B_1$ in the output digital signal of the AD converter 14 is close to 0.5 if the feedback system is in the normal lock state. In the false lock state, however, since the most significant bit output $B_1$ is biased to either one of the codes "1" and "0" as described previously, the mark ratio deviates from the abovesaid value 0.5. Then, the mark ratio of the most significant bit output $B_1$ is detected, and the feedback system is decided to be in the normal or false lock state depending upon whether the mark ratio is in a $0.5 \pm \alpha$ region (where $\alpha$ is determined by the number of levels of the input signal) or in some other region.

Figure 5:
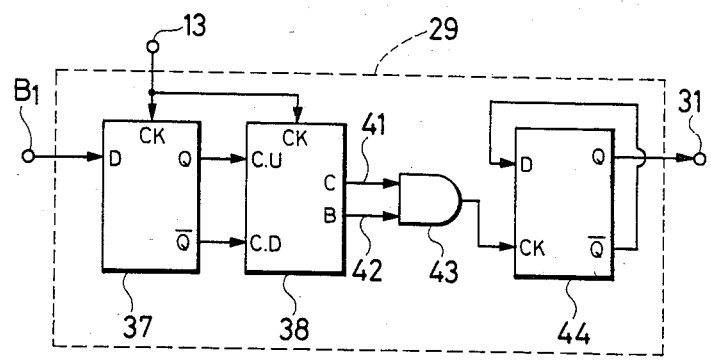
FIG. 5 is a logic circuit diagram illustrating an example of the decision means 29 in the case of making a decision based on a bias of a mark ratio of the decided output.

The decision means 29 which utilizes the mark ratio can be constructed, for instance, as shown in FIG. 5. The most significant bit output $B_1$ is supplied to a D flip-flop 37, in which it is sampled in synchronism with the clock signal from the clock input terminal 13, and Q and $\overline{Q}$ outputs of the flip-flop 37 are applied to count-up and count-down terminals C.U and C.D of an up-down counter 38, respectively. The counter 38 counts up or down by one depending upon whether the count-up or count-down terminal C.U or C.D is positive when the clock is applied to the clock input terminal 13. Accordingly, the counter 38 adds the number of "1s" of the most significant bit output $B_1$ and subtracts the number of "0s" thereof, so its count is the difference between the numbers of "1s" and "0s". A predetermined value is preset in the counter 38, and when its count reaches the preset upper or lower limit value, the counter 38 provides a carry signal 41 at its output terminal C or a borrow signal 42 at its output terminal B. The counter 38 always yields a "1" output at each of the output terminals C and B, and when a carry or borrow occurs, the output goes to a "0". The carry and borrow signals 41 and 42 are applied to an AND circuit 43, the output signal of which is provided to a T flip-flop 44, the Q output signal of which serves as the decision signal 31.

In the normal state the output signal 31 of the flip-flop 44 is a "0", but when the DC level superimposed on the multi-level amplitude signal at the input side of the AD converter 14 greatly deviates from the level in the ideal lock state to the positive (or negative) side, the ratio that the most significant bit output $B_1$ goes to a "1" (or "0") increases and the counter 38 produces the carry signal 41 (or borrow signal 42), by which the flip-flop 44 toggles to make its output 31 a "1", enabling the gate 36 in FIG. 4. Incidentally, α which determines the normal lock region is dependent upon set values of the upper and lower limit values of the count of the counter 38.

Figure 6:
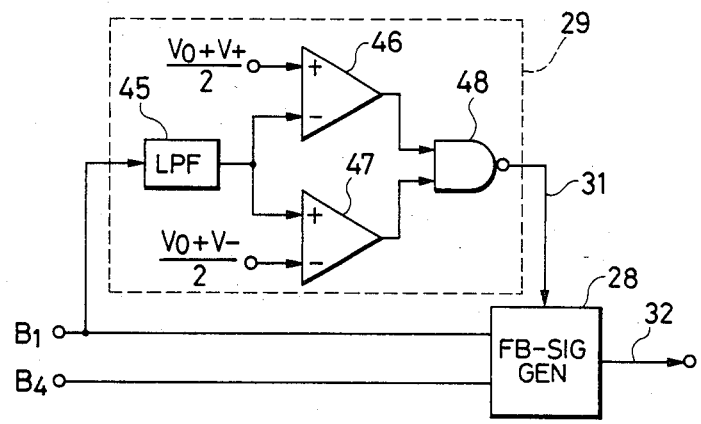
FIG. 6 is a block diagram illustrating an example of the decision means 29 in the case of making a decision based on a mean voltage of the most significant bit.
Figure 7:
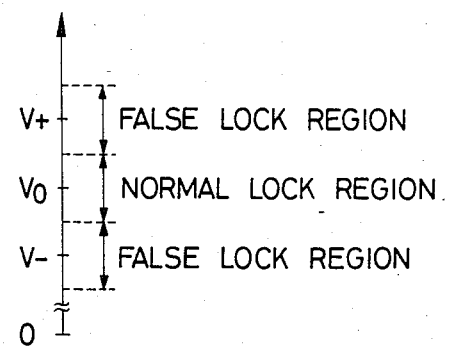
FIG. 7 is a diagram showing mean voltages of the most significant bit output $B_1$ in the cases of the normal lock state and the false lock state.

Next, a description will be given of the decision means 39 which utilizes the average voltage value. For example, as shown in FIG. 6, the most significant bit output $B_1$ from the AD converter 14 is branched to and integrated by a low-pass filter 45 and its integrated output is supplied to voltage comparators 46 and 47. The comparators 46 and 47 compare the input signals with preset voltage values $(V_0+V_+)/2$ and $(V_0+V_-)/2$, respectively. The comparators 46 and 47 each yield a "1" or "0" output in dependence upon whether the input signals do not exceed or exceed the preset voltage values towards the positive and the negative side, respectively. Here, $V_0$, $V_+$ and $V_-$ are DC voltage values obtained by averaging (integrating) the most significant bit outputs $B_1$ in the normal lock state and the false lock state, $V_0$ indicating the value in the normal lock state and $V_+$ and $V_-$ values (when the input level deviates from the $V_0$ towards the positive side and the negative side, respectively) in the false lock state. The outputs of the comparators 46 and 47 are applied to a NAND circuit 48, the output of which is used as the decision signal 31. That is, in the normal lock state, the comparators 46 and 47 produce "1" outputs and the output 31 of the NAND circuit 48 is a "0", by which the gate 35 (FIG. 4) is enabled. When the feedback system is put in the false lock state, the output of one of the comparators 46 and 47 goes to a "0" and the output of the NAND circuit 48 goes to a "1", enabling the gate 36.

As described previously, the decision means 29 is to detect that the DC level superimposed on the multi-level amplitude signal at the input side of the AD converter 14 deviates from the DC level in the normal lock state in excess of a predetermined value. Accordingly, the decision signal 31 can also be obtained by branching the multi-level amplitude signal at the input side of the AD converter 14 and detecting whether the level of its average value (integrated value) deviates from the level in the normal lock state in excess of a predetermined value. That is, as indicated by the broken line in FIG. 4, the multi-level amplitude signal at the input side of the AD converter 14 is branched for input into the decision means 39. In this case, the decision means 29 may be of such a circuit arrangement as shown in FIG. 6, but the voltage values for setting in the comparators 46 and 47 and, if necessary, the time constant of the low-pass filter 45 are changed to adequate values.

In the above the occurrence of the false lock phenomenon is detected by the decision means 29, but this method is defective in that a decision error is produced in the course of recovery from the false lock to the normal lock state as long as a false lock state has to be detected. To avoid this, it is also possible to detect the likelihood of occurrence of the false lock phenomenon by the decision means 29 and to control the feedback system so that the false lock phenomenon is difficult to occur.

Figure 8:
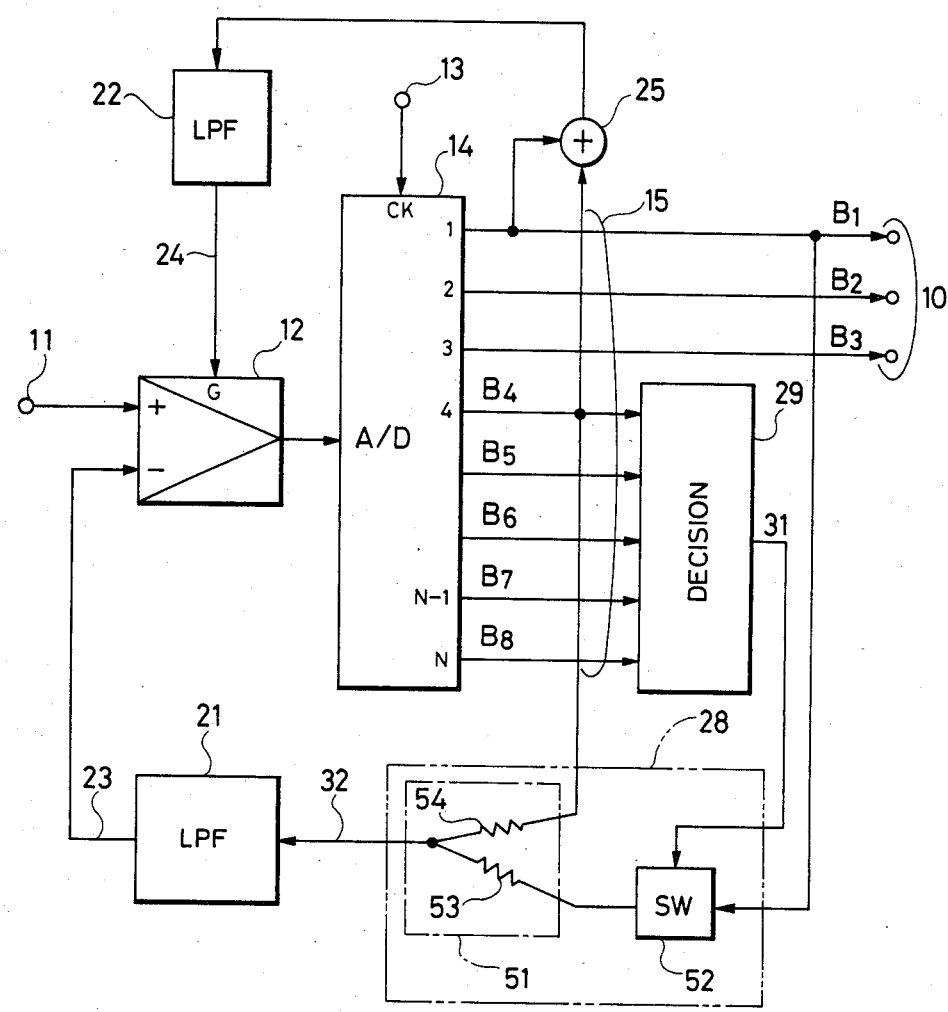
FIG. 8 is a block diagram illustrating an embodiment of the present invention designed for deciding the state in which a false lock phenomenon is likely to occur.

FIG. 8 illustrates an embodiment of such a method as being applied to the input $2^3$-level amplitude signal, the part corresponding to those in FIG. 4 being identified by the same reference numerals and characters. In the aforementioned examples the number N of bits of the output digital signal 15 from the AD converter 14 is described to be $M+1$ bits, but in this embodiment it is selected $M+k$ bits. Outputs $B_4$, $B_5$ . . . and $B_N$ of $K=N-M$ bits (K being an integer greater than 1) of the output digital signal 15 from the AD converter 14 are provided to the decision means 29, wherein the polarity and amount of intersymbol interference are detected and it is decided whether the DC level of the input multi-level amplitude signal is apart from the ideal lock state level in excess of a predetermined value in either positive or negative direction. The decision means 29 outputs a "1" or "0" depending upon whether the DC level deviation of the multi-level amplitude signal from the ideal level is greater than the predetermined value.

When it is decided by the decision means 29 that the DC level deviation of the multi-level amplitude signal exceeds the predetermined value in either positive or negative direction, at least one of the decided signals $B_1$, $B_2$ and $B_3$ at the output terminals 10 is added by an adder 51 to the error signal $B_4$ in response to the decision signal 31. The adder 51 is provided in the DC level control feedback signal generating means 28. In this example, when the decision signal 31 of the decision means 29 is a "1", an analog switch 52 provided in the generating means 28 is turned ON to pass the most significant bit output $B_1$ to the adder 51, wherein the output $B_1$ and the error signal $B_4$ are added together analogwise via adding resistors 53 and 54, respectively. The output of the adder 51 is provided as the DC level control feedback signal 32 to the low-pass filter 21. As a result of this, the deviation of the DC level of the multi-level amplitude signal at the input side of the AD converter 14 is reduced.

With the above arrangement, when the deviation of the DC level of the multi-level amplitude signal is smaller than the predetermined value, since the switch 52 is OFF, the signal for input to the low-pass filter 21 is only the error signal $B_4$, and as described previously in respect of FIG. 1, the DC level is controlled, by which the probability of the error signal $B_4$ going to a "1" or "0" becomes 50%. When the deviation of the DC level of the multi-level amplitude signal exceeds the predetermined value in either positive or negative direction, since the switch 52 is turned ON to supply the most significant bit output $B_4$ to the adder 51, the feedback signal 32 to the low-pass filter 21 is a linear summation of the error signal $B_4$ and the most significant bit output $B_1$.

When the DC level of the input multi-level amplitude signal is drifted slightly towards the positive side, the black circles indicating the respective levels of the input multi-level amplitude signals in FIG. 2 slightly shift upward and the probability that the three (M=3) high-order bit outputs $B_1$, $B_2$ and $B_3$ each go to a "1" rises. When the switch 52 is turned ON, the DC level control signal 23 from the low-pass filter 21 increases more quickly than in the case of the error signal $B_4$ alone. In consequence, the DC level superimposed on the multi-level amplitude signal from the DC amplifier 12 is controlled to shift towards the negative side, by which the level of the multi-level amplitude signal is normalized.

Conversely, when the multi-level amplitude signal is drifted towards the negative side, the probability that the three high-order bit outputs $B_1$, $B_2$ and $B_3$ each go to a "0" increases. When the switch 52 is ON, the DC level control feedback signal 23 increases towards the positive side more quickly than in the case of the error signal $B_4$ alone and the DC level of the output amplitude signal of the DC amplifier 12 is controlled to shift towards the positive side, in consequence of which the level of the multi-level amplitude signal is normalized. The AD converter 14 outputs $+V_1$ (volt) in the case of logic "1" and $-V_1$ (volt) in the case of logic "0".

By controlling the magnitude of the DC level control signal 23 itself through using a plurality of low-order bit outputs of the AD converter 14 as described above and by selecting the predetermined value (the set value) in the decision means 29 to such a value as described below, it is possible to construct a high precision multi-level decision circuit which is free from the false lock phenomenon.

The predetermined value defines high and low reference values above and below the normal lock state level corresponding to the threshold levels $B_4$. The high and low reference values for use in the decision means 29 can be selected arbitrarily within $\pm d/2$ of the minimum signal level interval d relative to the lock state level and, in this example, they are selected to be $\pm d/4$, respectively. FIG. 9 shows the relationships of two adjacent levels of the 8-level input amplitude signal to error signals $B_4$, $B_5$, $B_6$, $B_7$ and $B_8$ of its $5=8-3$ ($K=N-M$) low-order bits in this case. In FIG. 9 two adjacent levels of the 8-level input amplitude signal are indicated by circles and the range $\pm d/2$ of variation in the DC level by arrows. The fourth bit output $B_4$ represents the direction of drift and the fifth to eighth bit outputs $B_5$ to $B_8$ the amounts of drift.

Figure 10:
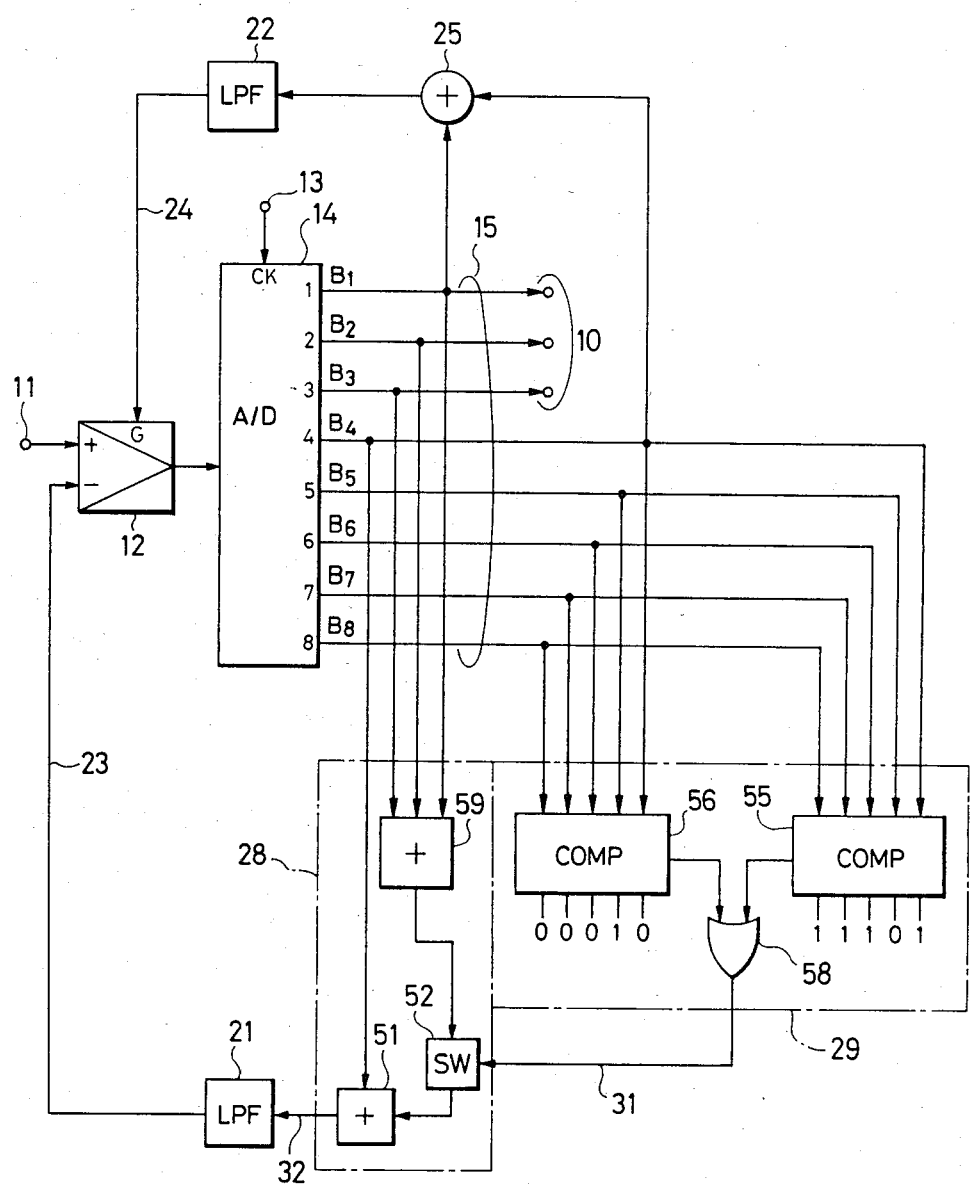
FIG. 10 is a block diagram illustrating a specific example of the decision means 29 in FIG. 8.

The decision means 29 can be arranged, for example, as shown in FIG. 10. That is, 5-bit comparators 55 and 56 are employed, by which the fourth to eighth bit outputs $B_4$ to $B_8$ of the digital signal 15 from the AD converter 14 are compared with high and low reference values $+d/4$ (=1001) and $-d/4$ (=01000), respectively. Thus, it is decided whether the drift is within $\pm d/4$. If a $+d/4$ DC drift occurs in the multi-level amplitude signal, then the error outputs $B_4$, $B_5$, $B_6$, $B_7$ and $B_8$ go in this order to "10111", as shown in FIG. 9. Consequently, the error output agrees with the reference value "10111" in the 5-bit comparator 55, from which a "1" is output, deciding that the DC drift of the multi-level amplitude signal exceeds the high reference value $+d/4$.

Similarly, when a $-d/4$ DC drift occurs in the multi-level amplitude signal, the error outputs $B_4$, $B_5$, $B_6$, $B_7$ and $B_8$ go in this order to "01000", and the 5-bit comparator 56 detects coincidence between the error output and the low reference value "01000" and yields a "1", deciding that the DC drift of the multi-level amplitude signal exceeds the low reference value $-d/4$.

The outputs of the comparators 55 and 56 are provided as the output decision signal 31 of the decision means 29 via an OR circuit 58. Accordingly, the decision signal 31 from the decision means 29 goes to a "0" or "1" depending upon the DC drift of the multi-level amplitude signal is within $\pm d/4$. The relationships of the DC drift and the outputs of the comparators 55 and 56 and the decision means 29 are also shown in FIG. 9.

In the example of FIG. 10, the decided signals $B_1$, $B_2$ and $B_3$ are all added together by an analog adder 59, the output of which is provided via the analog switch 52 to the adder 51, and the analog switch 52 is controlled by the decision signal 31 from the decision means 29 so that it is turned ON or OFF depending upon whether the decision signal 31 is a "1" or "0". By using all of the decided signals $B_1$, $B_2$ and $B_3$ in this way, the DC drift of the multi-level amplitude signal can be quickly reduced less than the reference values ($\pm d/4$).

In general, in the case where the multi-level input signal is $2^M$-level and the AD converter 14 is of the N-bit (N>M) output type, it is necessary only to form the decision means 29 using the comparators 55 and 56 of K (=N−M) bits in the same manner as shown in FIG. 10. Incidentally, the reference values for the DC drift can and must be changed according to design, and this can be achieved by changing the reference values of the comparators 55 and 56.

Figure 11:
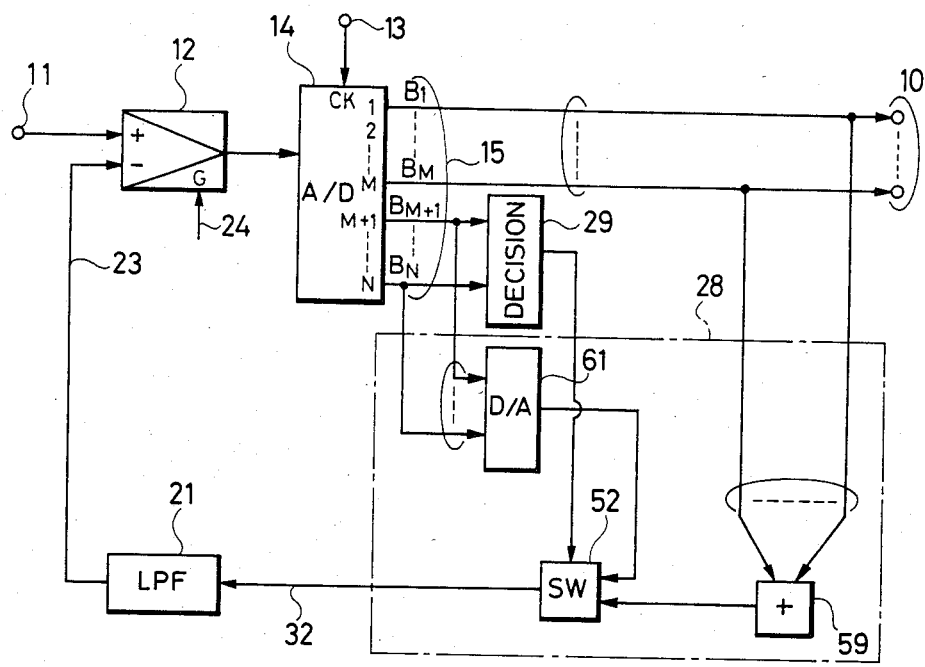
FIGS. 11 to 13 are block diagrams illustrating other embodiments of the present invention which decide, by the deciding means, the state in which the false lock state is likely to occur.

As will be appreciated from FIG. 9, the K low-order bits ($B_4$ to $B_8$ in FIG. 9) of the output digital signal 15 of the AD converter 14 vary with the magnitude of the DC drift. By using these low-order bits as the DC level control feedback signal, it is possible to effect control according to the magnitude of the DC drift. For instance, as shown in FIG. 11, error signals $B_{M+1}$ to $B_N$ of the K low-order bits in the output digital signal 15 of the AD converter 14 are converted by a DA converter 61 into analog form. The error signals $B_{M+1}$ to $B_N$ (in FIG. 9 the fourth to eighth bits $B_4$ to $B_8$) correspond to the magnitude of the DC drift of the multi-level amplitude signal. As will be seen from, for example, FIG. 9, when the amount of the DC drift is $+d/2$, the fourth to eighth bits all go to a "1" and when the amount of the DC drift is $-d/2$, they all go to a "0". Therefore, the output analog voltage value of the DA converter 61 is in proportion to the amount of the DC drift of the multi-level amplitude signal. The decision signal 31 from the decision means 29 controls the analog switch 52, through which the output of the DA converter 61 or adder 59 is provided as the DC level control feedback signal 32 to the low-pass filter 21 depending upon whether the DC drift is less or more than $\pm d/4$. In the case where the amount of DC drift increases relatively large while the output of the DA converter 61 is being supplied to the low-pass filter 21, the DC level control signal 23 increases, and when the amount of DC drift diminishes, the DC level control signal 23 decreases, so that an excellent control characteristic can be obtained. When the DC drift of the multi-level amplitude signal exceeds $\pm d/4$, the decision signal 31 of the decision means 29 goes to a "1" and the switch 52 is changed over to select the output of the adder 59, performing feedback control. Although not shown in FIG. 11 as well as succeeding FIGS. 12 to 17, the most significant bit output $B_1$ and the (M+1)th bit output are supplied to the exclusive OR circuit 25 and the exclusive-ORed output is applied via the low-pass filter 22 to a gain control terminal G of the amplifier 12 as is the case shown in FIG. 4.

Figure 12:
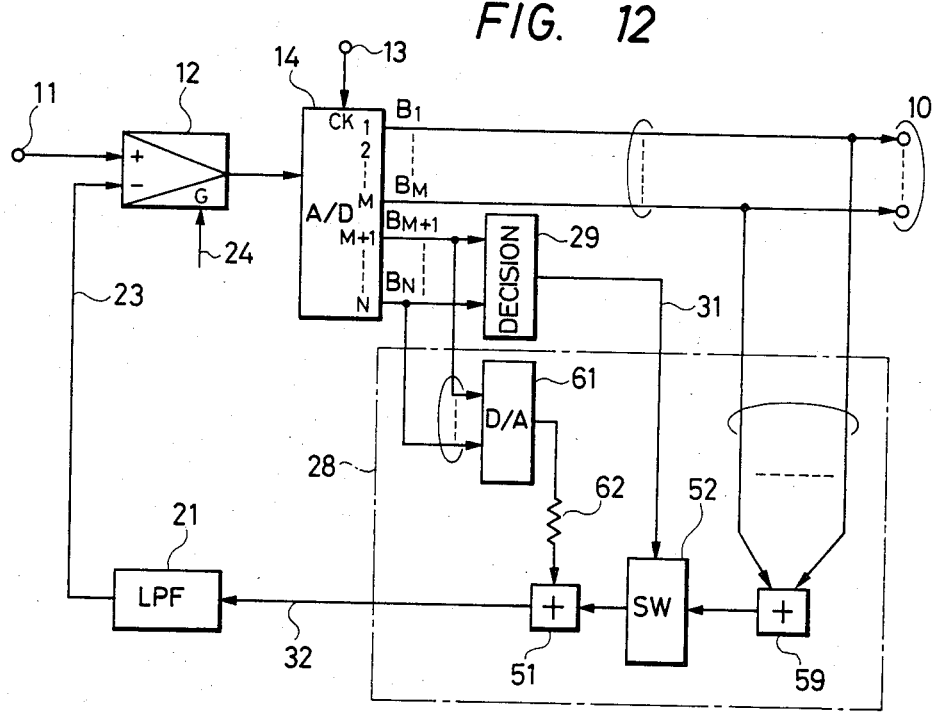

It is also possible to adopt such an arrangement as shown in FIG. 12. With this arrangement, when the drift of the multi-level input signal exceeds $\pm d/4$, the switch 52 is turned ON by the decision signal 31 of the decision means 29 and the output of the adder 59 and the output of the DA converter 61 via a resistor 62 are added together in the adder 51, the output of which is supplied to the low-pass filter 21. When the DC drift is less than $\pm d/4$, the switch 52 is held OFF and the output of the DA converter 61 alone is provided to the filter 21. By always applying the output of the DA converter 61 as the DC level control feedback signal 32 to the filter 21 and by additionally supplying the first to M bit outputs (decided signals) $B_1$ to $B_M$ when the DC drift exceeds $\pm d/4$, it is possible to obtain a high accuracy multi-level decision circuit which is free from the false lock phenomenon. Incidentally, the magnitude ratio between the output from the DA converter 61 and the output from the switch 52 to be added can be determined by a suitable selection of the resistance value of the resistor 62.

Figure 13:
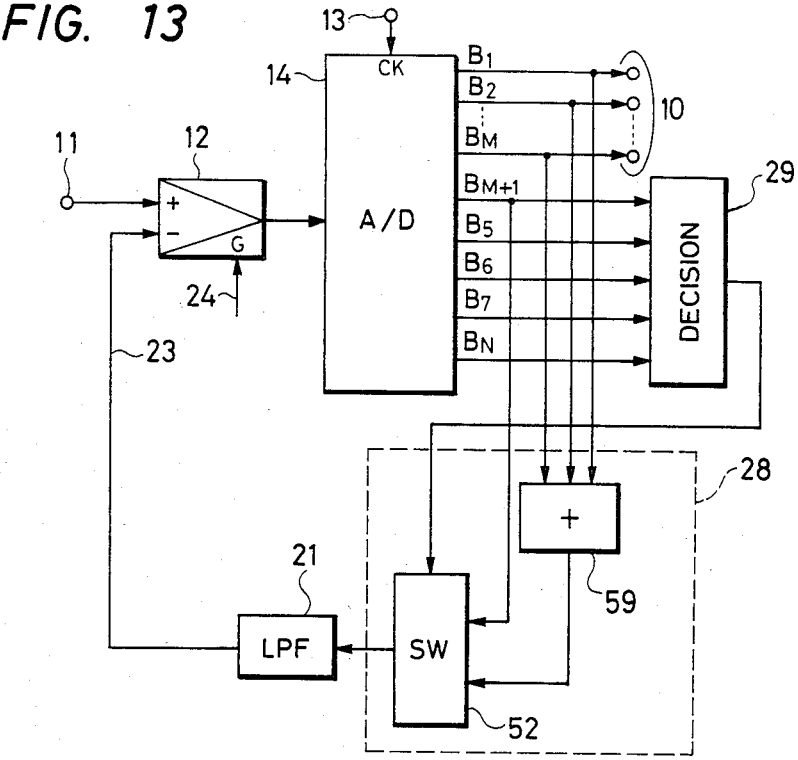
Figure 14:
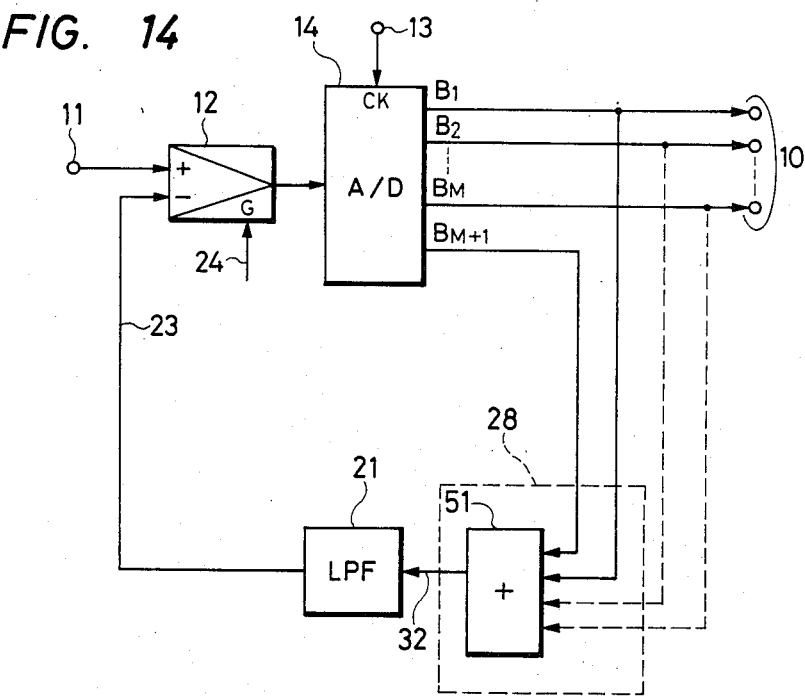
FIGS. 14 and 15 are block diagrams illustrating other embodiments of the present invention which do not employ the decision means.
Figure 15:
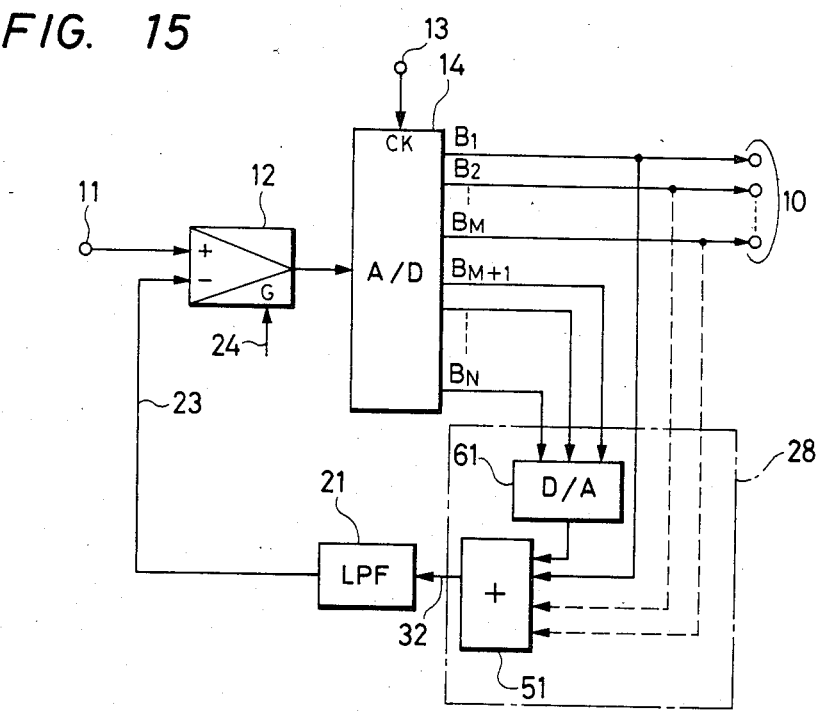

Also in the arrangements of FIGS. 11 and 12, at least one of the high-order bit outputs $B_1$ to $B_M$ may also be supplied to the switch 52 when the DC level is greater than the predetermined value. As shown in FIG. 13, it is also possible to selectively apply the error signal $B_{M+1}$ and the output of the adder 59 to the low-pass filter 21 depending on whether the DC drift is less or more than a predetermined value, respectively. In this case, too, when the DC drift is greater than the predetermined value, it is necessary only to supply at least one of the high-order bit outputs $B_1$ to $B_M$ via the switch 52 to the low-pass filter 21. Further, the decision means 29 may be omitted, in which case the error signal $B_{M+1}$ and at least one of the decided outputs $B_1$ to $B_M$ are always added by the adder 51, the output of which is provided to the filter 21, as shown in FIG. 14. It is also possible to utilize such an arrangement as shown in FIG. 15 in which the error signals $B_{M+1}$ to $B_N$ are converted by the DA converter 61 to an analog signal, which is always added to at least one of the decided outputs $B_1$ to $B_M$ in the adder 51 for input to the filter 21. The examples of FIGS. 14 and 15 are not preferable in that since components ($B_1$ to $B_M$), which are unnecessary for operation when the feedback system is not in the false lock state, are used as a part of the DC level control feedback signal 32, variations are caused in the DC level of the multi-level amplitude signal at the input side of the AD converter 14; however, this arrangement eliminates the necessity of providing the decision means 29, and hence is very simple in construction.

While in the above the DC level and amplitude (gain) of the input multi-level amplitude signal are controlled through the use of the differential, variable-gain DC amplifier 12, they may also be controlled separately. The point is to control the DC level and amplitude (gain) of the input multi-level amplitude signal on the signal path from the signal input terminal 11 to the AD converter 14. For the DC level control an analog subtractor with no gain may also be used; namely, the only requirement is the capability of shifting the DC level of the multi-level amplitude signal by the DC level control signal 23.

Figure 16:
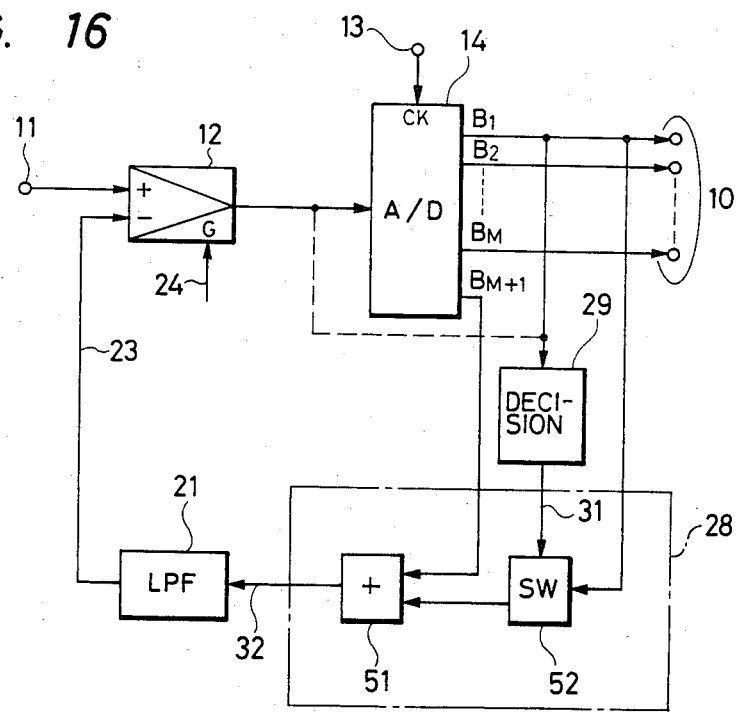
FIG. 16 is a block diagram illustrating another embodiment of the present invention for deciding the false lock state.
Figure 17:
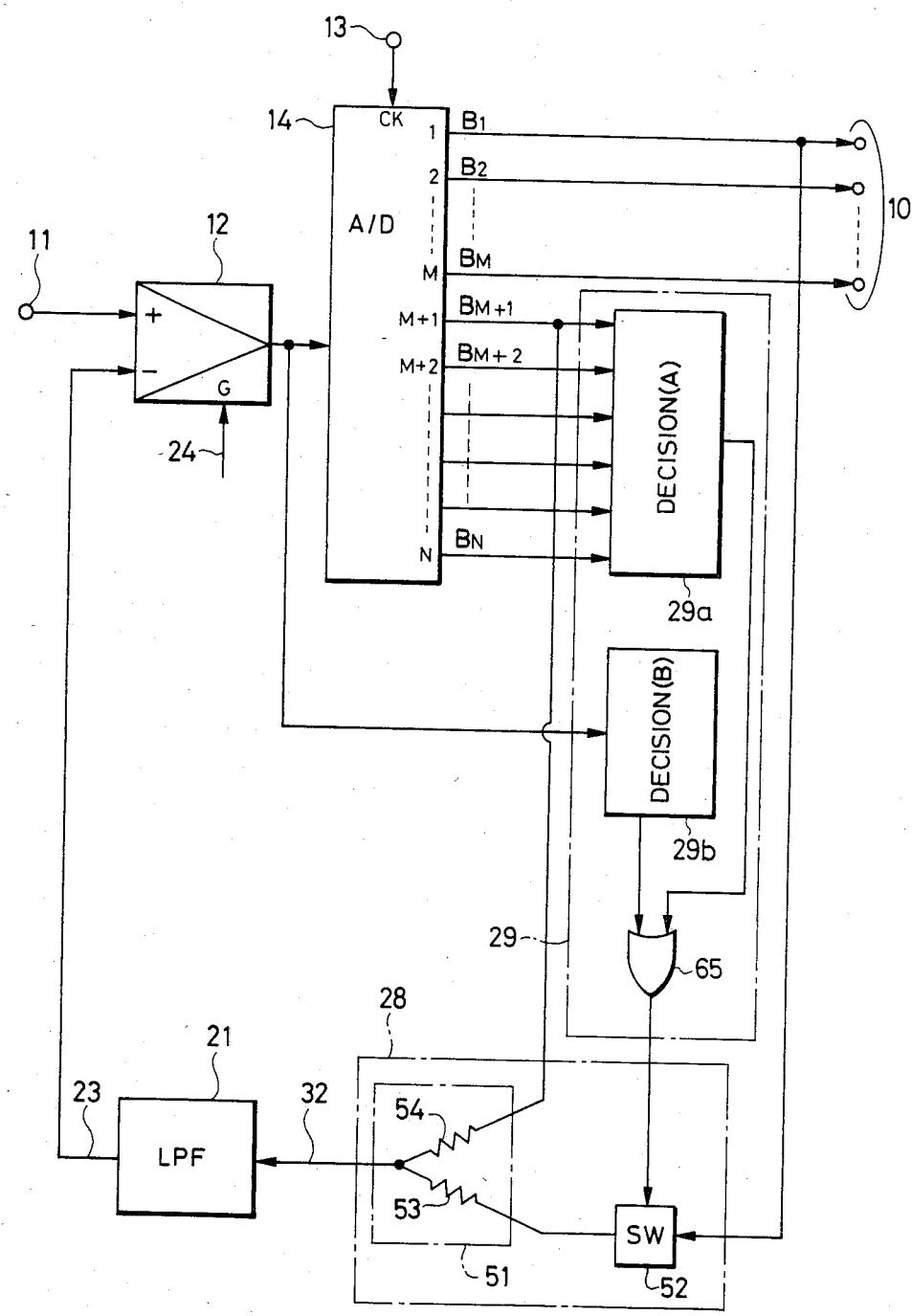
FIG. 17 is a block diagram illustrating another embodiment of the present invention which decides the state in which the false lock state is likely to come about, or the false lock state itself.

As described in the above, the multi-level signal decision circuit detects the false lock state of the feedback system and automatically returns the system to its normal lock state, or detects the likelihood of a false lock phenomenon and automatically puts the feedback system into the normal lock state in which the false lock phenomenon is difficult to occur, thereby always holding the DC level of the multi-level amplitude signal at the input side of the AD converter 14 at a correct value. In the field of digital radio communications it is effective for enhancement of the frequency utilization efficiency to increase the number of levels in the multi-level quadrature amplitude modulation system. With an increase in the number of levels as in 64 QAM, 256 QAM, and so on, however, the decision threshold margin lowers and the false lock phenomenon comes about or is likely to occur owing to an external disturbance such as fading, but the present invention ensures a correct decision regardless of such an increased number of multi-levels. As illustrated in FIG. 16, also in the case of detecting the false lock state by the decision means 29, it is possible to arrange such that when the feedback system is in the normal lock state, the output $B_{M+1}$ is always supplied via the adder 51 to the low-pass filter 21 and when the feedback system is decided to be in the false lock state, the switch 52 is turned ON by the decision signal 31 to pass therethrough the most significant bit output $B_1$ to the adder 51 for addition to the bit output $B_{M+1}$. Moreover, also in the examples of FIGS. 4 and 16, it is possible to select the number N of bits of the output digital signal 15 of the AD converter 14 two or more larger than the number M and to use, as the DC level control feedback signal 32, the outputs $B_{M+1}$ to $B_N$ of the (M+1)th to Nth bits in the digital signal 15. Besides, the decision means 29 may also be designed to detect the state in which the false lock phenomenon is likely to come about and the false lock state itself. For example, as shown in FIG. 17, the (M+1)th to Nth bit outputs $B_{M+1}$ to $B_N$ in the output of the AD converter 14 are provided to a decision means 29a for detecting the likelihood of the false lock phenomenon. As the decision means 29a is used, for example, the decision means 29 shown in FIG. 10. The input to the AD converter 14 is branched to another decision means 29b, which has an arrangement such, for instance, as shown in FIG. 6 and which detects the false lock state. The outputs of these decision means 29a and 29b are ORed by an OR circuit 65, by the output of which is controlled the switch 52. In this case, the outputs of the decision means 29a and 29b and the OR circuit 65 become such as shown in FIG. 18 according to the normal lock state and the false lock state, and the OR circuit 65 yields a "1" output, turning ON the switch 52. Incidentally, the provision of such two decision means 29a and 29b for controlling the switch 52 can also be applied the examples illustrated in FIGS. 11 through 13.

It will be apparent that many modifications and variations may be effected without departing from the scope of the novel concepts of the present invention.

What is claimed is:

1. A multi-level signal decision circuit comprising:
  a DC level control means supplied with a multi-level amplitude signal of $2^M$ (M being an integer equal to or greater than 2) levels, for changing, by a DC level control signal, the DC level to be superimposed on the output multi-level amplitude signal;
  an AD converter connected to the output side of said DC level control means, for converting its output multi-level amplitude signal into a digital signal of N (N being an integer greater than M) bits and providing its M high-order bits as a multi-level decided output to an output terminal;
  a feedback signal generating means supplied with the output of at least an (M+1)th one of (M+1)th and less significant bits of the AD converter output and at least one of its M high-order bits, for generating a DC level control feedback signal; and
  a low-pass filter for integrating the DC level control feedback signal from said feedback signal generating means and feeding it as the DC level control signal back to said DC level control means, each of said feedback signal generating means and said low-pass filter constituting a part of a feedback system.

2. A multi-level decision circuit according to claim 1 which comprises a decision means for deciding whether a deviation of the DC level superimposed on the multi-level amplitude signal at the input side of the AD converter is greater or smaller than a predetermined value, and wherein said feedback signal generating means includes switch means for providing, in response to an output decision signal from said decision means, the said at least (M+1)th bit output as the DC level control feedback signal when it is decided that the deviation of the DC level is less than the predetermined value, and providing the said at least one of the M high-order bits as the DC level control feedback signal only when it is decided that the deviation of the DC level is greater than the predetermined value.

3. A multi-level decision circuit according to claim 2 wherein said decision means decides whether said feedback system is in a false or normal lock state, and wherein said switch means of said feedback signal generating means is a change-over switch and outputs at least one of the M high-order bit outputs as the DC level control feedback signal when it is decided that said feedback system is in the false lock state, and outputs only the (M+1)th bit output as the DC level feedback signal when it is decided that said feedback system is in the normal lock state.

4. A multi-level decision circuit according to claim 2 wherein said decision means decides whether said feedback system is in a false or normal lock state, wherein said switch means of said feedback signal generating means is an ON-OFF switch, wherein the (M+1)th bit output is always provided as the DC level control feedback signal, and wherein when it is decided that said feedback system is in the false lock state, said ON-OFF switch is turned ON and at least one of the M high-order bit outputs is superimposed on the (M+1)th bit output for output as the DC level control feedback signal.

5. A multi-level decision circuit according to claim 3 or 4 wherein said decision means decides whether the deviation of the DC level exceeds the predetermined value depending on a ratio of the probabilities of occurrence of a "1" and "0" with respect to at least one of the M high-order bit outputs of said AD converter.

6. A multi-level decision circuit according to claim 3 or 4 wherein said decision means decides whether the deviation of the DC level exceeds the predetermined value depending upon whether an average voltage of the most significant bit output of said AD converter is higher than a predetermined value.

7. A multi-level decision circuit according to claim 3 or 4 wherein said decision means branches the input multi-level amplitude signal of said AD converter, integrates the branched output and decides whether the deviation of the DC level exceeds the predetermined value depending upon whether the level of the integrated output is higher than a predetermined value.

8. A multi-level decision circuit according to claim 2 wherein said decision means decides whether said feedback system is likely to be in a false lock state or is in a normal lock state, and wherein the number N of bits of the output digital signal of said AD converter is two or more larger than the said M and said decision means decides whether the absolute value of the N-bit digital output of said AD converter is larger than a predetermined value smaller than a minimum signal level interval of the input multi-level amplitude signal, thereby deciding whether the deviation of the DC level is in excess of the predetermined value.

9. A multi-level decision circuit according to claim 8 wherein said switch means is a change-over switch and outputs only the (M+1)th bit output as the DC level control feedback signal when it is decided by said decision means that the deviation of the DC level is less than the predetermined value and, outputs only at least one of the M high-order bit outputs as the DC level control feedback signal when it is decided by said decision means that the deviation of the DC level is greater than the predetermined value.

10. A multi-level decision circuit according to claim 8 wherein said switch means is an ON-OFF switch, wherein the (M+1)th and less significant bit outputs in the output digital signal of said AD converter are always provided as the DC level control feedback signal, and wherein when it is decided by said decision means that the deviation of the DC level is greater than the predetermined value, said ON-OFF switch is turned ON and at least one of the M high-order bit outputs is superimposed on the (M+1)th and less significant bit outputs for output as the DC level control feedback signal.

11. A multi-level decision circuit according to claim 1, 2, 3 or 4, wherein the number N of bits of the output digital signal from said AD converter is two or more larger than the said M, and wherein said feedback signal generating means comprises a DA converter for converting the (M+1)th and less significant bit outputs in the output digital signal into an analog signal for output as the DC level control feedback signal when it is decided by said decision means that the deviation of the DC level is less than the predetermined value.

12. A multi-level decision circuit according to claim 8, 9 or 10, wherein said feedback signal generating means comprises a DA converter for converting the (M+1)th and less significant bit outputs in the output digital signal into an analog signal for output as the DC level control feedback signal when it is decided by said decision means that the deviation of the DC level is less than the predetermined value.

13. A multi-level decision circuit according to claim 2 wherein the decision means comprises a first means for deciding whether a feedback system is likely to be in a false lock state or is in a normal lock state, a second means for deciding whether the feedback system is in the false lock state or normal lock state, and an OR circuit for ORing the outputs of the first and second means.

* * * * *